(12) United States Patent
McCarren et al.

(10) Patent No.: US 9,066,499 B2
(45) Date of Patent: Jun. 30, 2015

(54) ADJUSTABLE COLLAR

(76) Inventors: Michael McCarren, Grovetown, GA (US); Anthony J. Baxter, Upper Montclair, NJ (US); Paul Michael Elhardt, Charlotte, NC (US)

(*) Notice: Subject to any disclaimer, the term of this patent is extended or adjusted under 35 U.S.C. 154(b) by 397 days.

(21) Appl. No.: 13/103,956

(22) Filed: May 9, 2011

(65) Prior Publication Data

US 2012/0285396 A1 Nov. 15, 2012

(51) Int. Cl.
*A01K 27/00* (2006.01)
*A44B 11/26* (2006.01)

(52) U.S. Cl.
CPC ........... *A01K 27/001* (2013.01); *Y10T 24/4745* (2015.01); *A44B 11/266* (2013.01)

(58) Field of Classification Search
CPC ... A01K 27/00; A01K 27/001; A01K 27/002; A01K 27/005
USPC .................................. 119/792, 856, 863, 865
See application file for complete search history.

(56) References Cited

U.S. PATENT DOCUMENTS

| | | | | |
|---|---|---|---|---|
| 4,309,797 A * | 1/1982 | Schrougham et al. | .......... | 24/307 |
| 5,322,037 A * | 6/1994 | Tozawa | ......................... | 119/865 |
| 5,443,039 A * | 8/1995 | Suchowski | .................... | 119/865 |
| 5,673,463 A | 10/1997 | Chih-wen | | |
| 5,701,849 A * | 12/1997 | Suchowski et al. | ........... | 119/865 |
| 6,205,956 B1 * | 3/2001 | Dickie et al. | .................. | 119/792 |
| 6,378,466 B1 * | 4/2002 | Oyster et al. | .................. | 119/863 |
| 6,715,449 B1 * | 4/2004 | Jordan | ......................... | 119/863 |
| 6,899,060 B1 * | 5/2005 | Yen | ................................ | 119/863 |
| 7,287,491 B2 * | 10/2007 | Zents et al. | ..................... | 119/863 |
| 2006/0144345 A1 * | 7/2006 | Kover et al. | ................... | 119/865 |
| 2006/0283403 A1 * | 12/2006 | Okai | .............................. | 119/863 |
| 2009/0229537 A1 * | 9/2009 | Muelken | ....................... | 119/792 |
| 2012/0325164 A1 | 12/2012 | Finlan | | |

* cited by examiner

*Primary Examiner* — David Parsley
(74) *Attorney, Agent, or Firm* — Jeffrey Sonnabend; SonnabendLaw

(57) ABSTRACT

An adjustable collar system including a strap member having first and second ends and a housing assembly configured to slideably receive on the strap member. The housing assembly including a first end portion configured and operable to detachably engage the first end of the strap member and a second end portion configured and operable to adjustable affix to a portion of the strap member in proximity to the second end of the strap member.

10 Claims, 6 Drawing Sheets

ADJUSTABLE COLLAR

FIELD OF THE INVENTION

The present invention relates to collars, and more particularly to adjustable collars.

BACKGROUND OF THE INVENTION

Adjustable collars are well known. There are many uses for adjustable collars including: pet collars; consumer straps for homeowners and businesses; baby proofing; electrical applications; vehicle uses; packaging applications; reusable zip ties; watch bands and other similar uses.

With regards to pet collars, and for both the safety of the pet and the safety of others, an important factor in responsible animal ownership is providing for the safe and efficient restraint of the animal, while maximizing the comfort of the animal. In addition to pets, non-pet animals, such as might be found in zoos, occasionally require restraint.

The most common means of animal restraint, at least for many small animals such as cats and dogs, has been through the use of collars placed around the animal's neck. A well-designed animal collar must conform to such requirements as closeness of fit, strength, durability and good looks, and availability of options such as points of attachment for identification and license tags, or leashes. A type of collar sometimes used is a harness, which encompasses in varying degrees, some part of the shoulders and neck. The art has long needed improvements in animal collars that address closeness of fit and adjustability. Closeness of fit and adjustability is primarily important for two reasons. First, many small animals, such as cats and dogs, have heads that are not much larger in diameter than the diameter of their necks. Accordingly, if a collar fits too loosely, the animal may "back-out" of the collar; that is, by applying retrograde pressure against the restraint of the collar, the animal can pull a loosely fitting collar backwards over its ears and escape. Additionally, a too loose collar invites entanglement with such objects as fences and tree limbs, often with disastrous strangulation to the animal and heartbreak to the owner. However, a too tight collar or harness should also be avoided. A collar that is too tight is both uncomfortable for the animal and liable to interfere with breathing, especially as the animal exercises, and can possibly lead to chafing, sores, or infection.

The issue of closeness of fit is also a variable requiring periodic adjustment. If an animal is acquired as a juvenile, such as a puppy or kitten, it will require a number of size adjustments to its collar as it grows. An adjustable animal collar that is adjustable over a wide plurality of lengths obviates the need to buy replacement collars as the animal grows. Even as an adult, an animal may gain or lose weight, and require adjustment to the size of its collar. However, adjustment must be dependable, that is, it must be easy to adjust when needed, but not change adjustment in response to the activities of the animal.

The traditional means for providing adjustment is that of providing a plurality of holes near one end of a circumferential collar, designed to be engaged by a locking pin of some sort. The obvious shortcoming of this system is that there is no adjustability between holes in the collar, and animal owners must sometimes choose between holes that may be too tight or too loose, or else drill an additional hole between two pre-existing holes. Such a drilling task can be arduous, depending on the collar material, and can mar the appearance of the collar. Each new adjustment location requires a new hole to be drilled, possibly filling the collar with a plurality of unsightly and weakening holes.

Animal owners desire a collar that is durable and good looking. A traditional material is leather, but this has numerous drawbacks. Leather is difficult to keep clean, and is susceptible to water damage. This is particularly apparent with animals that live outdoors, or who enjoy playing in water, as a leather, or even fabric or otherwise "weather resistant" collar can rapidly become moldy and offensive with repeated wetting.

Accordingly, the art has needed a means for improving the art of animal collars. While some of the prior art devices attempted to improve the state of the art of animal collars, none has achieved the unique and novel configurations and capabilities of the present invention.

SUMMARY OF THE INVENTION

The present invention, in accordance with the illustrated embodiments, relates to an adjustable collar system. The adjustable collar system may include a strap member having first and second ends, with a locking assembly provided on the first end. A housing assembly may be provided which is configured to slideably receive on the strap member. The housing assembly may include a first end portion configured and operable to detachably engage the locking assembly of the first end of the strap member. The first end portion of the housing assembly may include an upper channel portion configured to slideably receive, and detachably engage, the locking assembly of the first end of said strap member. The housing assembly further may include a second end portion including an adjustment assembly configured and operable to detachable engage a portion of the strap member in proximity to the second end of the strap member. The adjustment assembly may include first and second adjustment tab members resiliently attached to a body portion of the housing assembly configured to each detachably affix to a second end potion of the strap member for providing adjustability of the collar system.

BRIEF DESCRIPTION OF THE DRAWINGS

The objects and features of the invention may be understood with reference to the following detailed description of an illustrative embodiment of the present invention taken together in conjunction with the accompanying drawing in which.

DETAILED DESCRIPTION

The following disclosure presents and describes various exemplary embodiments in sufficient detail to enable those skilled in the art to practice the invention, and it should be understood that other embodiments may be realized without departing from the spirit and scope of the invention. Thus, the following detailed description is presented for purposes of illustration only, and not of limitation, and the scope of the invention is defined solely by the appended claims.

Figure 1:
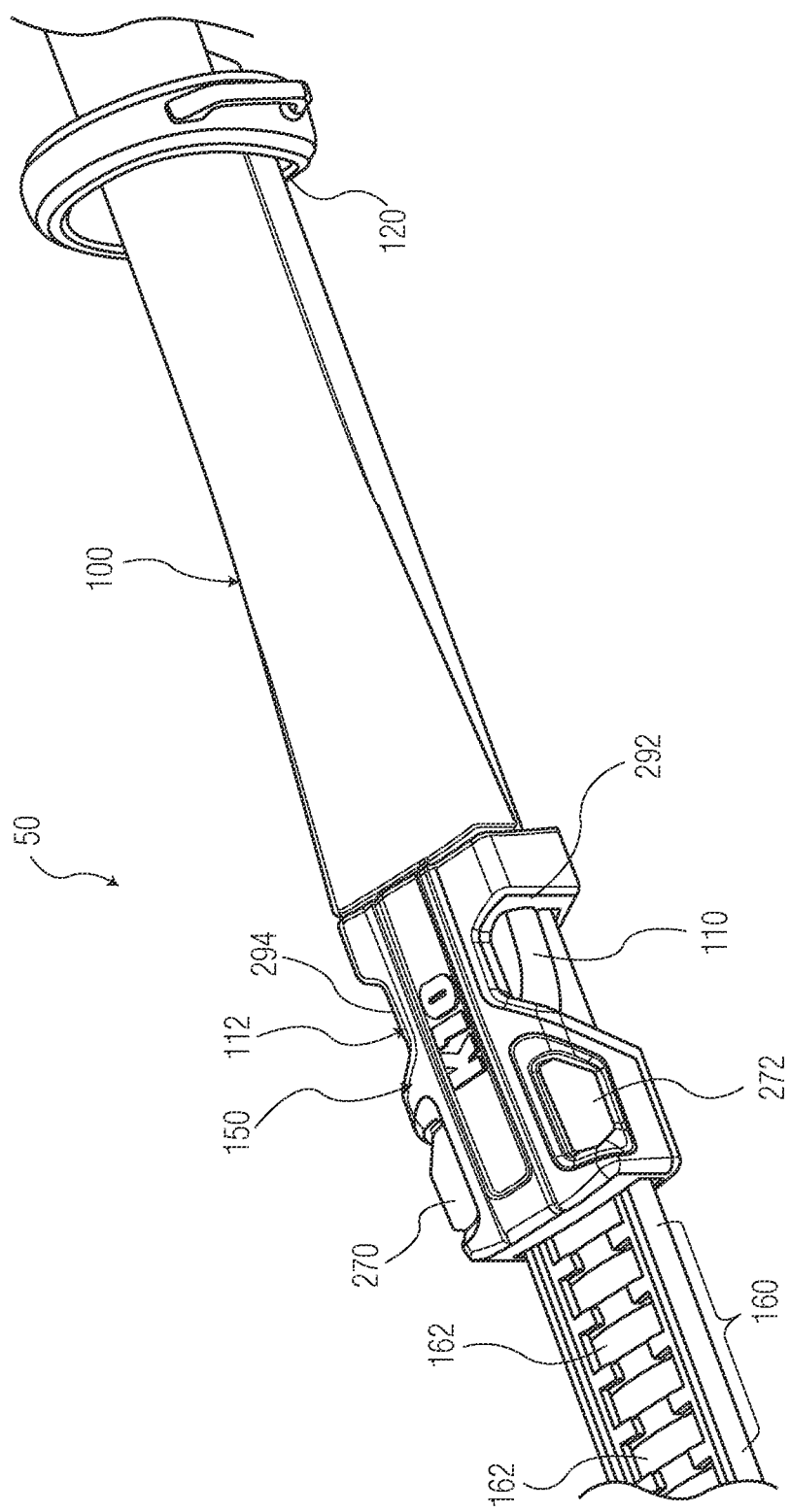
FIG. 1 and 1A is a perspective view of the present invention collar system.
Figure 1A:
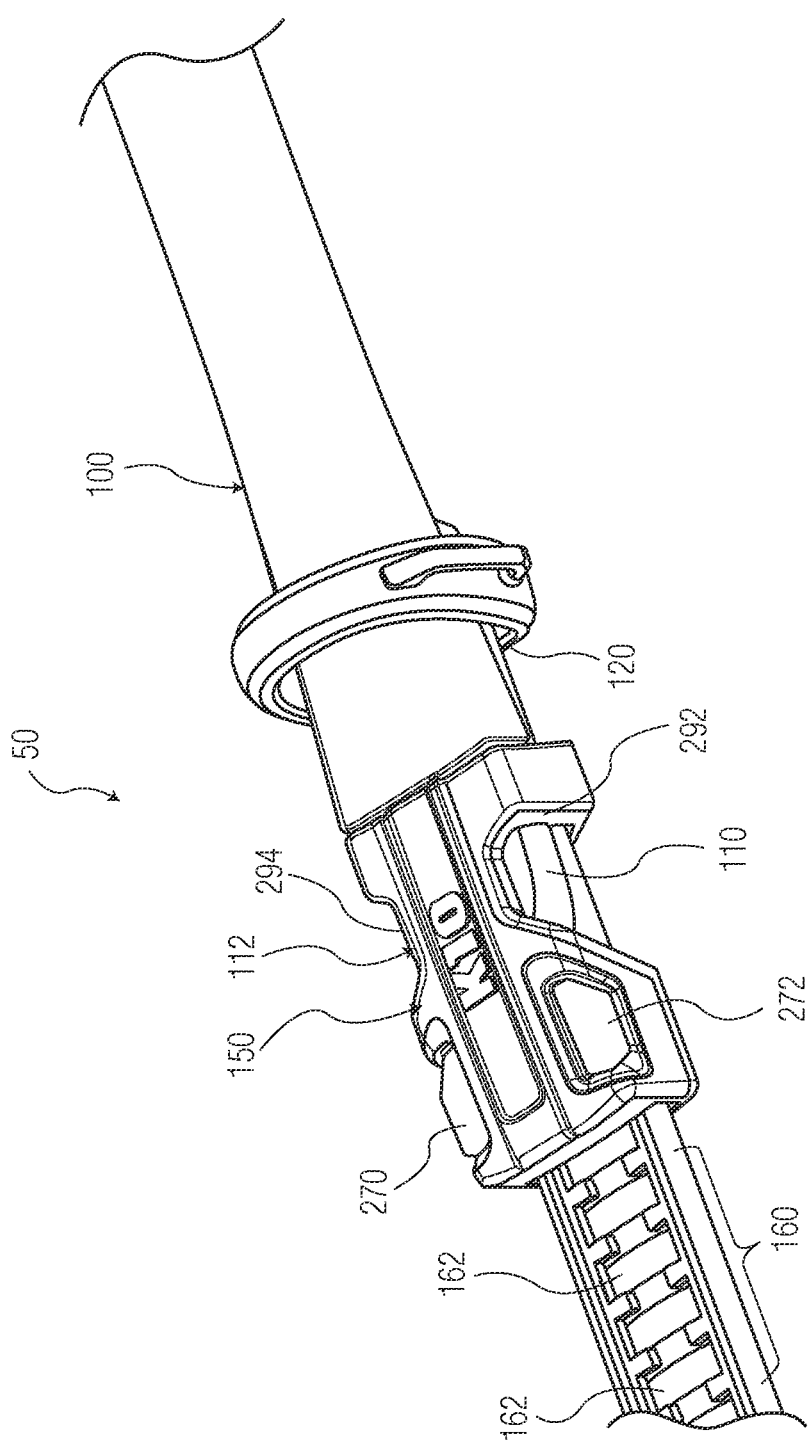

With reference now to certain illustrated embodiments of the present invention, and with initial reference to FIG. 1, illustrated is a collar system generally referenced by numeral 50. It is to be appreciated that collar system 50 may be used for many applications, requiring the use of such an adjustable collar, including: pet collars; consumer straps for homeowners and businesses; baby proofing; electrical applications; vehicle uses; packaging applications; reusable zip ties; watch bands and other similar uses. For ease of description, the present invention is to be described in connection with a pet collar, but it is to be appreciated that it is not to be understood to be limited thereto as it may encompass any of the aforesaid applications and like uses.

It is to be understood that some or all of the below described components of the present invention collar system 50 in accordance with the illustrated embodiments are preferably formed of thermoplastic material. An advantage of using thermoplastic materials is resilience to harboring odor producing bacteria and germs, while providing a material that is easy to clean and glides easily over an application, such as a pet.

Figure 2:
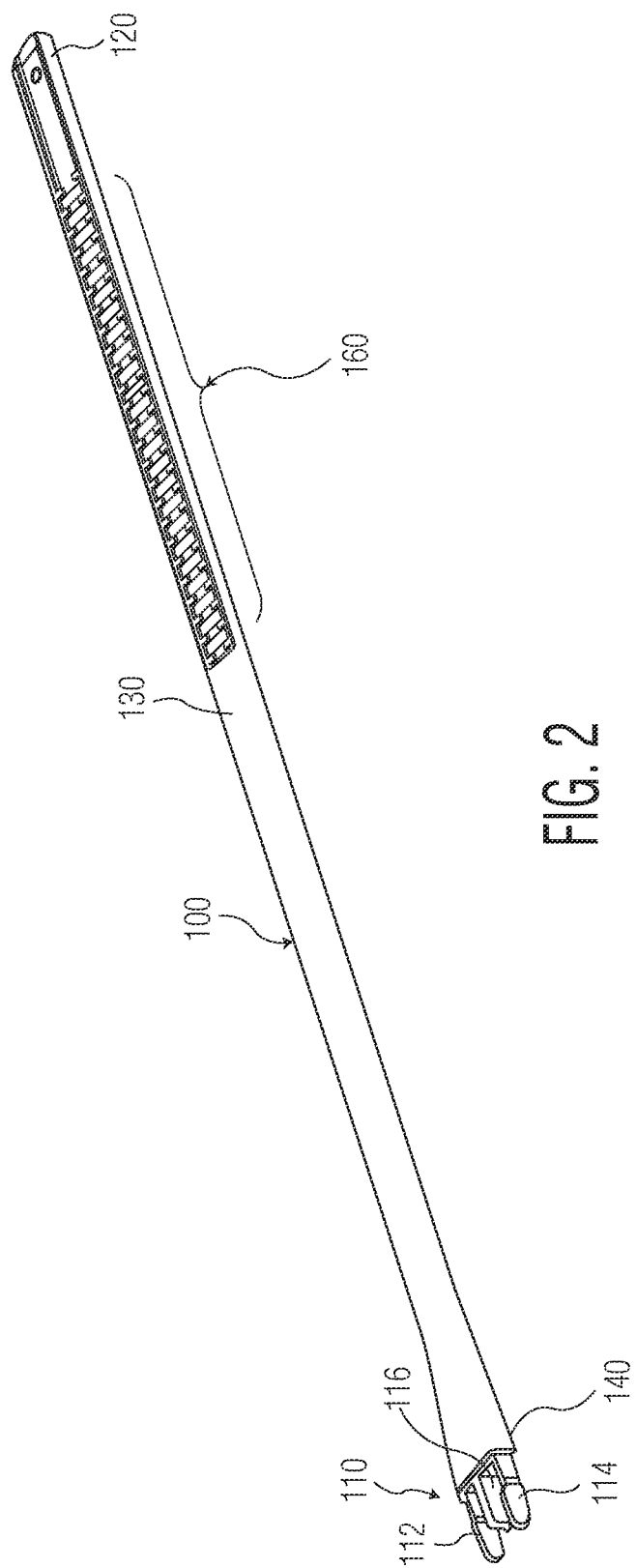
FIGS. 2 and 2A are perspective views of the strap member used in the collar system shown in FIG. 1.
Figure 2A:
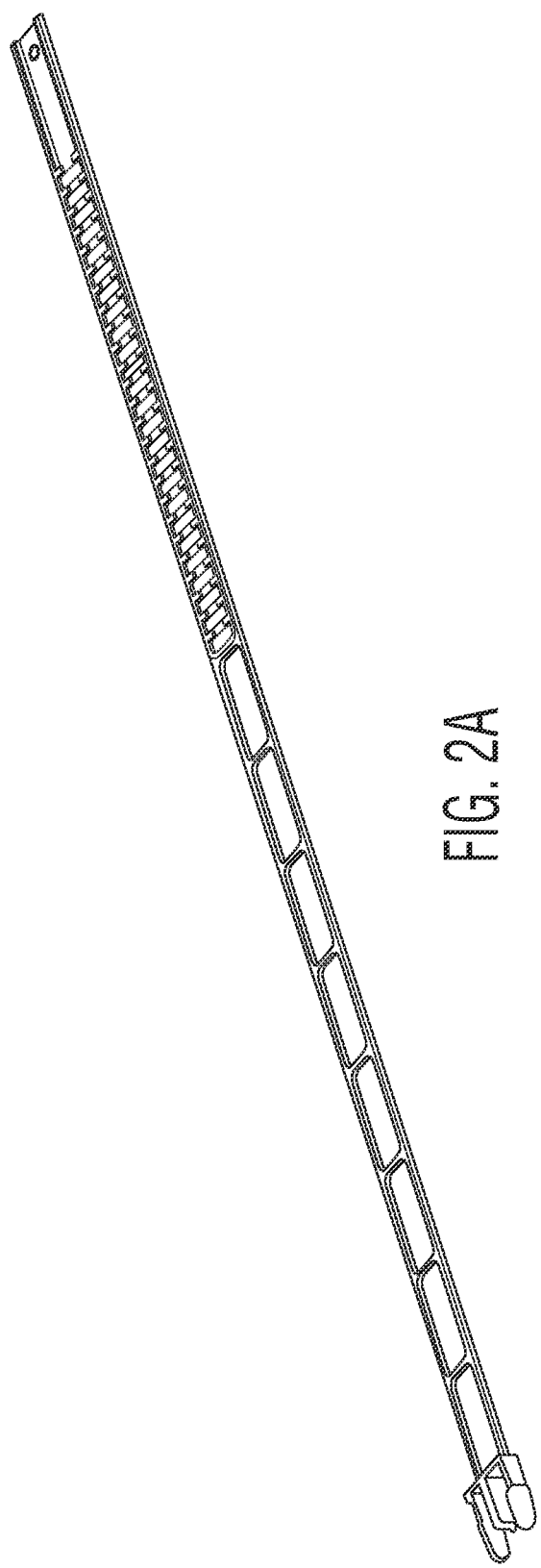

In its most general appearance, referring now to FIGS. 1 and 2, the present invention, an adjustable animal collar 50, in accordance with the illustrated embodiments, comprises in part a strap 100 having a first end 110, a second end 120, and at least a top surface 130 and a bottom surface 140 (FIG. 2). The collar system 50 also includes a housing assembly 150 (FIG. 1). As described further below, the housing assembly 150 connects to the strap 100, located substantially at the first end 110 thereof. The housing assembly 150 is adapted to slideably receive the second end 120 of the strap 100, thus completing the circumferential nature of the collar 50 about an animal's neck portion. The collar system 50 provides for adjustability via an engagement region 160 formed on the top surface 130 of the strap 100 in proximity to the second end 120 of the strap 100. In the illustrated embodiment, the engagement region 160 includes a plurality of formed teeth 162. The width of the teeth 162 may be varied according to the application intended.

With reference to FIG. 2, the first end 110 of the strap 100 is preferably formed with first and second locking tabs 112, 114 having a center guide member 116 disposed therebetween. The first and second locking tabs 112, 114 are each configured to be deflectable towards the center guide member 116, so as to engage and disengage with the housing assembly 150, as described further below.

Figure 3:
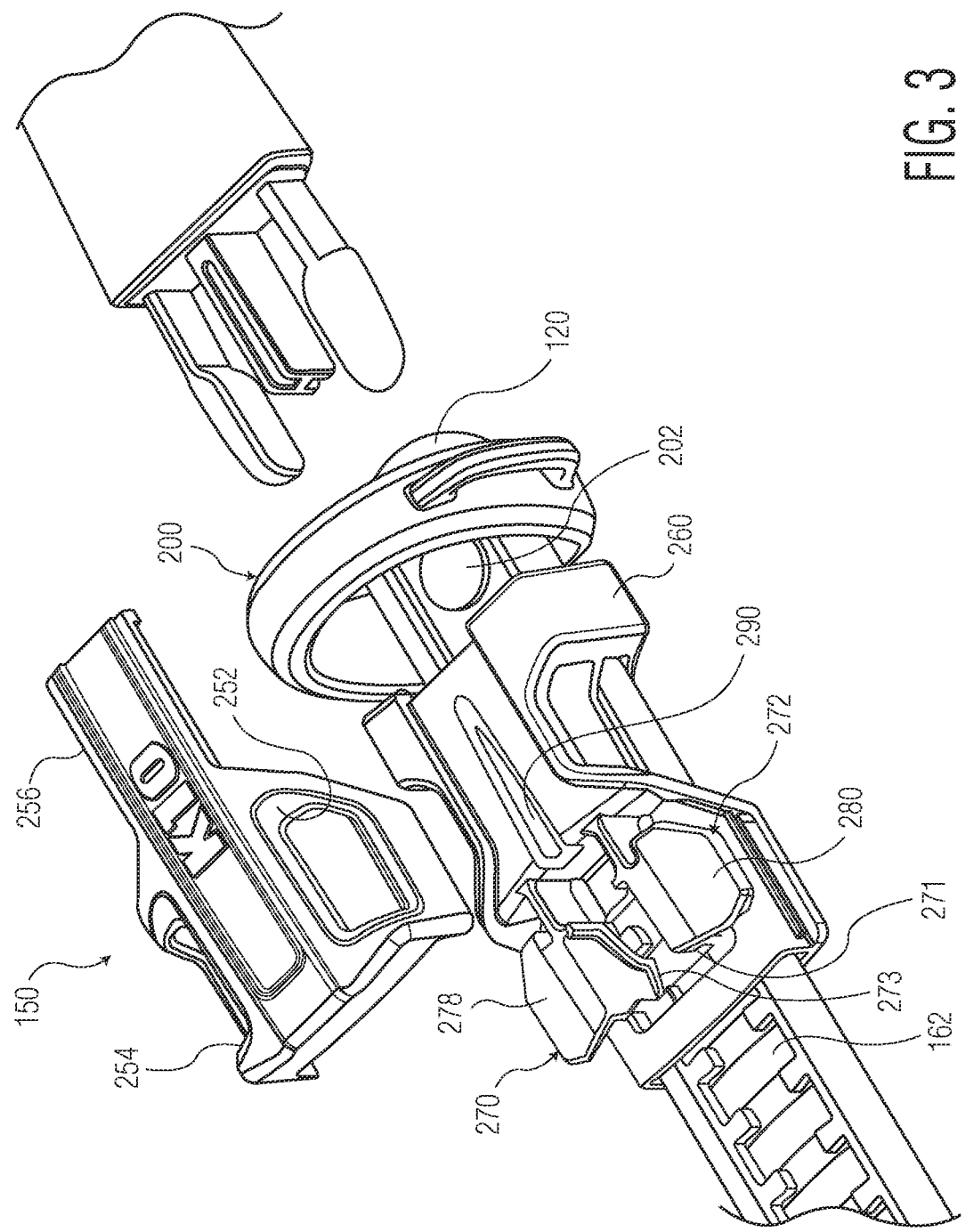
FIGS. 3 and 4 are exploded perspective views of the collar system of FIG. 1.
Figure 4:
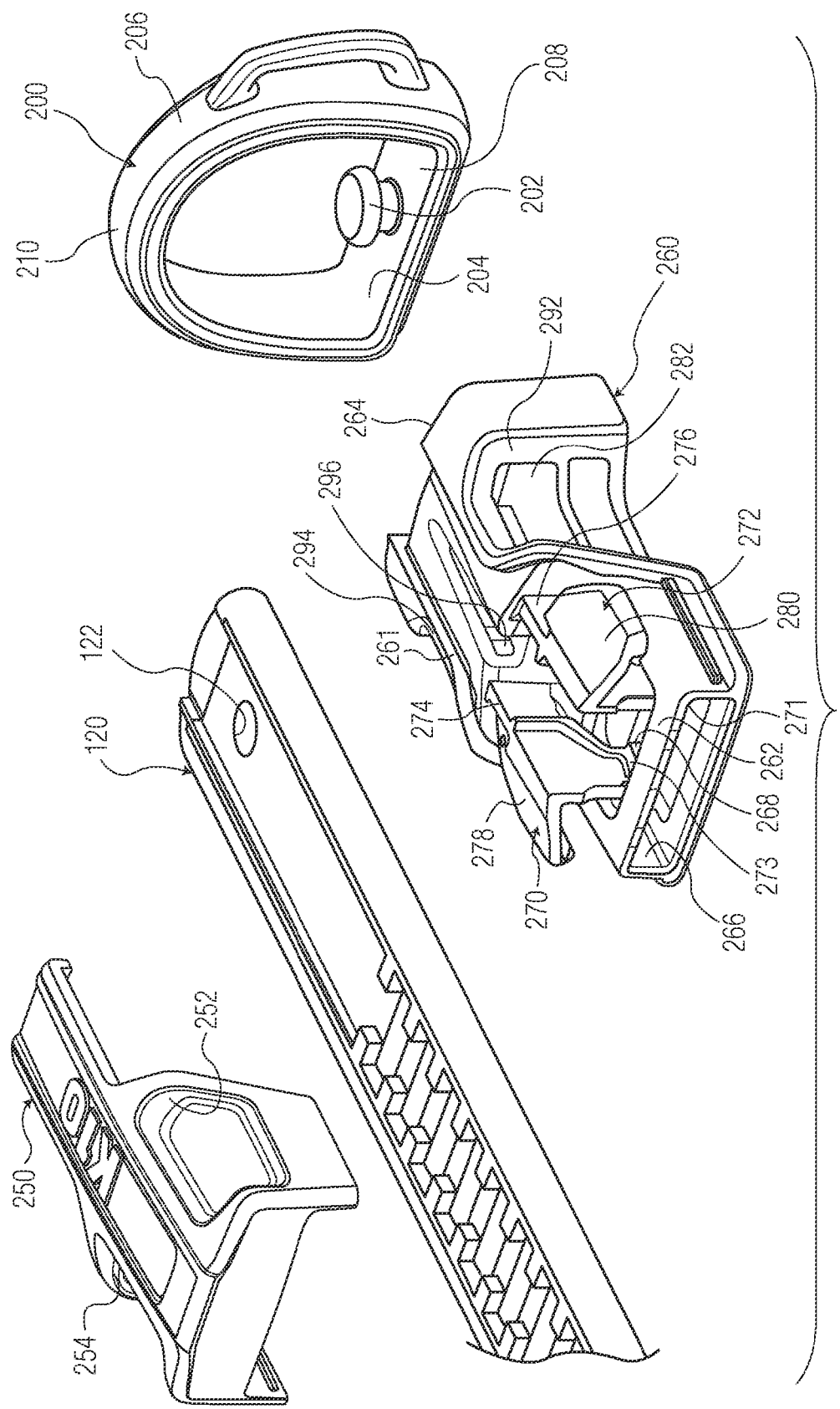

As shown in FIG. 4, the second end 120 of the strap 100 is formed with an aperture 122 dimensioned to fit about a raised detent 202 formed in the inner circumference 204 of an annular ring member 200. Annular ring member 200 is formed by a generally curved side and top portion 206 and flat bottom portion 208. Annular ring member 200 has an inner surface circumferential portion 204 and an outer circumferential portion 210. As shown in FIG. 4, the raised detent 202 extends upwardly from the inner surface 202 on the flat bottom portion 108 thereof. An attachment handle 212 extends from the outer circumferential portion 210 preferably configured and dimensioned to attach to a pet leash. As best shown in FIG. 3, the annular ring member 200 snaps fit with the second end 120 of the strap 100 via the snap fitting of aperture 122 about detent 202.

As shown in FIG. 4, the housing assembly 150 includes a top portion 250 which preferably snap fits upon a bottom portion 260. The bottom portion 260 includes first 262 and second ends 264 and a bottom channel 266 dimensioned to slideably receive therethrough the second end 120 of the strap 100. The first end 262 is formed with a cutout portion 268 through which extends first 270 and second 272 adjustment tabs when detachably engaged thereto. Each adjustment tab 270, 272 has a bottom portion 271, 273 that extends through the cutout portion 268 and a side portion 274, 276 that resiliently extends from a body portion 261 of the lower housing assembly 260. Each adjustment tab 270, 272 further includes a top portion 278, 280, preferably angled downwards. Each adjustment tab 270, 272 is operable such that as a user depresses downward on the top portion 278, 280 of each adjustment tab 270, 272, the bottom portion 271, 273 of each adjustment tab 270, 272 moves upwards and towards one another in cutout portion 268 so as to disengage from the engagement region 160 of the strap 100, as discussed further below.

The second end 262 of the lower housing assembly 260 is formed with an upper channel 282 configured to slideably receive the locking members 112, 114 provided on the first end 110 of the strap 100. Projecting downward in the upper channel 282 is a guide post 290 configured to slideably receive the guide member 116 provided on the first end 110 of the strap 100. The second end 262 of the lower housing portion 260 is also formed with respective cutout portions 292 and 294 configured such that when the locking tabs 112, 114 of the first end 110 of the strap 100 are inserted within the upper channel 282 of the lower housing assembly 260, the locking tabs 112, 114 extend within each respective cutout portion 292, 242.

As best shown in FIG. 3, the top portion 250 of the housing assembly 150 is configured to preferably snap fit onto the lower housing 260. Formed in the top portion 250 of the housing assembly 150 are tab openings 252, 254 through which extend the top portions 278 and 280 of adjustment tabs 270, 272 when the top portion 250 of the housing assembly 150 is fitted to its lower portion 260 (see FIG. 1).

With the structure and configuration of the collar system 50 described above, its method of use will now be discussed.

Starting with reference to FIG. 3, it is to be understood that the second end 120 of the strap assembly 100 is slideably received through the lower channel of the housing assembly 150 so as to pass through the first end 262 and extend through the second end 264. The second end 120 of the strap 100 is then attached to the annular ring member 200, as mentioned above. Also, it is to be understood that the upper portion 250 of the housing assembly 150 is preferably snap fitted to the lower portion 260 of the housing assembly 150, as shown in FIG. 1.

With reference now to FIG. 1, it is to be understood the first end 110 of the strap is wrapped about a pet's neck portion (not shown) such that the locking tabs 112, 114 are inserted within, and detachably locked, via a resilient locking tab fit, within the upper channel 282 of the housing assembly 150 such that the locking tabs 110, 112 extend within the aforesaid cutout portions 292, 294 defined in the housing assembly 150. Thus, to remove the first end 110 of the strap 100 from the housing assembly 150 (and from a pet's neck portion), a user depresses the locking tabs 110, 112 inwards to disengage their respective locking portion from each respective cutout portion 292, 294 which then enables the second end 110 of the strap 100 to be separated from the housing assembly 150.

To adjust the fit of the collar system 50 around a pet's neck portion, the adjustment tabs 270, 272 are operable to selectively engage the teeth 162 defined (grooved) in the engagement region 160 provided on strap 100 in proximity to its second end 120. With returning reference to FIG. 3, when each adjustment tab 270, 272 is shown in its resting position, each bottom portion 271, 273 of each adjustment tab 270, 272 is deflected within, and engages with, a respective tooth 162 in the engagement region 160 so as to be temporarily affixed therewithin.

When adjustment of the strap 100 around a pet's neck portion is required, a user presses downward on the top portion 278, 280 of each adjustment tab 270, 272 causing the bottom portion 271, 273 of each adjustment tab 270, 272 to move upwards and towards one another thus disengaging from a respective tooth 162 in the engagement region 160 it was previously engaged with. This enables a user to slide the housing assembly 150 along the engagement region 160 of strap 100 so as to obtain a proper fit of the strap 100 around a pet's neck portion at which point the user releases the aforesaid adjustment tabs 270, 272 causing each to respectively bias within a respective tooth 162 it is located adjacent with relative the engagement region 160. Thereafter, the housing assembly 150 is temporarily affixed on the aforesaid portion of the engagement region 160 of strap 100.

Thus, an advantage of the present invention collar system 50 in accordance with the illustrated embodiments is the housing assembly 150 is configured and operable to detachably engage with a first end 110 of the collar strap 100 while being further configured and operable to slide along a second end portion of the collar strap 100 so as to adjustably affix thereto.

It is to be appreciated that only certain embodiments have been described herein to implement the collar system described above in accordance with certain features and advantages of the present invention. However, one skilled in the art will appreciate further features and advantages of the invention based on the above-described embodiments. Accordingly, the invention is not to be limited by what has been particularly shown and described, except as indicated by the appended claims.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth. For instance, it is to be appreciated that collar system may be used for many applications, other than pet applications, requiring the use of such an adjustable collar, including: as consumer straps for homeowners and businesses; baby proofing; electrical applications; vehicle uses; packaging applications; reusable zip ties; watch bands and other similar uses.

Although illustrated embodiments of the present invention has been described, it should be understood that various changes, substitutions, and alterations can be made by one of ordinary skill in the art without departing from the scope of the present invention.

What is claimed is:

1. An adjustable collar, comprising:
   a. a strap having a track along at least a part of the length of an upper surface thereof and an end, wherein the track comprises a channel and has multiple engaging positions on opposed sides thereof; and
   b. a housing having a first portion for releasably securing the strap end and a pair of outwardly biased portions, the outwardly biased portions being movable into and out of pairs of multiple engaging positions for releasably engaging any pair of the multiple engaging positions along the track,
   wherein upon release of the strap end from the first portion of the housing, the housing retains its engaging position along the track, thereby maintaining sizing of the adjustable collar.

2. The collar of claim 1, wherein the track has a central non-engaging portion extending along the track length.

3. The collar of claim 2, wherein the strap end has a central guide member.

4. The collar of claim 3, wherein the housing has a channel configured to receive the central guide member.

5. The collar of claim 4, wherein the strap end has an outwardly biased deflectable engaging tab on either side of the central guide member.

6. The collar of claim 5, wherein the first portion of the housing is configured to receive the deflectable tabs.

7. The collar of claim 6, wherein a portion of the deflectable tabs extend out of the housing.

8. The collar of claim 7, further comprising a ring attached to the collar.

9. The collar of claim 8, wherein the ring is detachably engages a secondary device to the collar.

10. The collar of claim 9, wherein the secondary device is a pet leash.

* * * * *